(12) United States Patent
Okabe

(10) Patent No.: US 7,108,622 B2
(45) Date of Patent: Sep. 19, 2006

(54) ROLLER CHAIN TRANSMISSION DEVICE

(75) Inventor: Isamu Okabe, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 124 days.

(21) Appl. No.: 10/947,878

(22) Filed: Sep. 23, 2004

(65) Prior Publication Data

US 2005/0119079 A1    Jun. 2, 2005

(30) Foreign Application Priority Data

Nov. 28, 2003    (JP) .............................. 2003-399494

(51) Int. Cl.
*F16H 7/06*    (2006.01)
*F16H 55/30*    (2006.01)
*F16G 13/06*    (2006.01)

(52) U.S. Cl. ...................... 474/156; 474/231; 474/152

(58) Field of Classification Search ................ 474/212, 474/148, 156, 230, 228, 226, 234; D08/499; 59/1–95
See application file for complete search history.

(56) References Cited

U.S. PATENT DOCUMENTS 5,186,569 A * 2/1993 Wu ............................ 403/154

5,192,252 A * 3/1993 Skurka et al. ............... 474/210
6,371,875 B1 * 4/2002 Young ........................ 474/161

FOREIGN PATENT DOCUMENTS

| EP | 1 235 003 A1 | 8/2002 |
| JP | 5-59014 | 8/1993 |
| JP | 2002-266988 | 9/2002 |
| WO | WO 98/29673 | 7/1998 |

* cited by examiner

*Primary Examiner*—Richard Ridley
*Assistant Examiner*—Kathleen Baldwin
(74) *Attorney, Agent, or Firm*—Howson and Howson

(57) ABSTRACT

A roller chain transmission comprises a sprocket having at least first teeth and second teeth having different tooth forms, the first teeth and second teeth being randomly arranged, and the number of the second teeth not exceeding four times of the number of the first teeth. The roller chain may also have pins of slightly differing diameters, randomly arranged along the length of the chain.

4 Claims, 6 Drawing Sheets

ROLLER CHAIN TRANSMISSION DEVICE

FIELD OF THE INVENTION

This invention relates to roller chain transmissions of the kind used for power transmission in automobiles, conveyors, and other industrial machinery. The invention relates particularly to a roller chain transmission use in the timing drive (i.e, the camshaft drive) of an automobile engine.

BACKGROUND OF THE INVENTION

In recent years, metal roller chains have come into increasing used in power transmissions, in automobile engines and in other machines, as a result of high loads, high speeds, and the demand for maintenance-free operation. Roller chain transmissions have displaced toothed belt transmissions to a large extent.

A typical roller chain transmission device comprises a roller chain including inner and outer links. Each inner link comprises a pair of inner link plates, two bushings, ends of which are press-fit into bushing holes formed in the inner link plates, and a roller rotatable on the outside of each bushing. Each of the outer links comprises a pair of outer link plates and two pins press fit into the outer link plates. The outer link plates of each outer link are in overlapping relationship with the inner link plates of two adjacent inner links, and a pin of each outer link extends loosely through a bushing of an adjacent inner link, whereby the inner and outer links are connected articulably in alternating relationship along the length of the chain. In the power transmission, the roller chain is typically in mesh with a drive sprocket and one or more driven sprockets.

Roller chains used in such a roller chain transmission device, include "A series" roller chains, which satisfy the relationships $0.59 \leq D/P \leq 0.64$, and $0.28 \leq d/P \leq 0.38$, and "B series" roller chains, which satisfy the relationships $0.57 \leq D/P \leq 0.67$, and $0.28 \leq d/P \leq 0.38$, D being the outer diameter of the roller, d being the outer diameter of the pin, and P being the chain pitch. These chains are chosen based on demands for a size balance and standardization (See Japanese Industrial Standard JIS B 1801).

Sprockets, having tooth forms which smoothly move at engagement with and disengagement from a roller chain and efficiently transmit rotational torque to a rotating shaft, are standardized, and a sprocket may be selected in accordance with the particular roller chain with which it is to be used.

To reduce noises generated at engagement between a chain and a sprocket, various approaches have been proposed. One is a low noise roller chain transmission device in which a roller and a chain are engaged with each other at a random pressure angle, by use of a roller chain in which two or more kinds of rollers having different outer diameters are randomly disposed along the length of the chain. Another uses a sprocket in which teeth having different shapes of flank surfaces are randomly disposed on the periphery of the sprocket. These approaches are described in Japanese laid-open Utility Model Publication No. Hei. 5-59014 and Japanese laid-open Patent Publication No. 2002-266988.

However, it has not been shown that the above-mentioned conventional low noise roller chain transmissions reduce engagement noise to any significant degree. Thus, to obtain an optimum reduction effect, it was necessary to use trial and error repeatedly.

Furthermore, it has been shown that a particularly large engagement noise between the roller and the chain occurs in specific regions of rotational speeds. However, in previous approaches to noise reduction, these abnormal noises, which occur at specific ranges of rotational speeds were not avoided.

Accordingly, taking the problems of the above-mentioned conventional roller chain transmission device into consideration, an object of the invention is to provide a roller chain transmission which reproducibly reduces engagement noises between a roller chain and a sprocket without the need for design by trial and error. Further, another object of the invention is to provide a roller chain transmission device, which suppresses abnormal noises which occur in specific regions of rotational speeds.

SUMMARY OF THE INVENTION

The roller chain transmission according to the invention comprises a roller chain including inner and outer links. Each inner link comprises a pair of inner link plates, two bushings, ends of which are press-fit into bushing holes formed in the inner link plates, and a roller rotatable on the outside of each bushing. Each of the outer links comprises a pair of outer link plates and two pins press fit into the outer link plates. The outer link plates of each outer link are in overlapping relationship with the inner link plates of two adjacent inner links, and a pin of each outer link extends loosely through a bushing of an adjacent inner link, whereby the inner and outer links are connected articulably in alternating relationship along the length of the chain. The transmission also comprises a sprocket having a tooth form, which engages with the roller chain. The sprocket has at least first teeth and second teeth having different tooth forms. The first teeth and second teeth are randomly distributed on the periphery of the sprocket, and the number of second teeth does not exceed four times the number of first teeth. Moreover, the first teeth are arranged so that none of the first teeth is immediately adjacent another first tooth. That is, the teeth immediately preceding and following each of the first teeth on the periphery of the sprocket are teeth of the second teeth.

The root radius R1 of the first teeth, the radius r1 of the arc of a bottom portion of the first teeth, the root radius R2 of the second teeth, the radius r2 of the arc of the bottom portion of the second teeth, the chain pitch P, the pitch diameter Dp of the sprocket, and the outer diameter Dr of the rollers, preferably satisfy the relational expressions $R1=(Dp-Dr)/2$ $R1-0.05\ P<R2<R1-0.015\ P$ $0.505\ Dr<r1<0.505\ Dr+0.069\ \sqrt[3]{Dr}$ $0.50\ Dr<r2<r1.$ The terms used in the above expressions are based on Japanese Industrial Standard JIS B 1801. The root radius R1 or R2 refers to the radius of a circle which has the same center as the sprocket, and is tanqent to the tooth bottoms as shown in FIG. 3. The radii r1 and r2 of an arc of a tooth bottom portion refers to the radius of a circle which is tangent to a tooth groove and centered on the pitch circle at a location midway between adjacent two tooth head lines of the sprocket as the center of the circle. The pitch diameter Dp refers to the diameter of a circle, which is tangent to the pitch line of a chain wrapped around the sprocket.

The pins preferably comprise first pins second pins having different pin diameters, randomly arranged in a longitudinal direction of the roller chain. Preferably, the first pins are present in the chain at a ratio of at least 20% of the total number of the pins in said chain, and second pins are also present in the chain at a ratio of at least 20% of the total number of the pins in the chain, and the diameter d1 of the first pins and the diameter d2 of the second pins preferably satisfy the relational expression 0.992 d1≦d2≦0.998 d1.

The random arrangement of the sprocket teeth disperses the time intervals of engagement between the chain and the sprocket, and the resulting engagement noise reduction can be reproduced. As a result, quiet operation is enhanced and the development of a quiet roller chain transmission can be simplified.

When the transmission satisfies the relationships $R1=(Dp-Dr)/2$ $R1-0.05\ P<R2<R1-0.015\ P$ $0.505\ Dr<r1<0.505\ Dr+0.069\ \sqrt[3]{Dr}$ $0.50\ Dr<r2<r1$ the engagement noise reduction effect is enhanced. These relational expressions are based on results of noise energy measurements performed as described later. When the root radius R2 (the radius of the tooth bottom circle) of the second teeth is smaller than R1−0.05 P, only a small engagement noise reduction is realized. On the other hand, if the root radius R2 is larger than R1−0.015 P, the engagement noise reduction effect is small, and additionally, the overall noise level of the entire device, including noises other than engagement noise, such as air noise and vibration noise, becomes large.

The radius r1 of the arc of the tooth bottom portion of the first teeth, in the expression $0.505\ Dr<r1<0.505\ Dr+0.069\ \sqrt[3]{Dr}$, is based on ISO "B" standard BS 228 as defined by the expression 3 in the above mentioned relational expression. When the radius r2 of an arc of the tooth bottom portion of the second teeth is smaller than r1, a the engagement noise reduction effect is increased. However, if r2 is equal to or less than 0.50 Dr, it becomes smaller than the outer diameter of the roller, which causes undesirable jumping of the sprocket teeth.

When the chain pins have different diameters and are randomly arranged in the longitudinal direction of the chain, the engagement noise reduction is further enhanced. Furthermore, when both the first and second pins are present in a quantity of 20% or more with respect to the total number of pins in the roller chain, and the diameters d1 of the first pins, and d2 of the second pins, satisfy the relational expression 0.992 d1≦d2≦0.998 d1 engagement noise reduction is still further enhanced.

The effects exerted by the above-described configurations of the sprocket and roller chain act synergistically, and engagement noise generated at specific rotational speed ranges, i.e., the occurrence of abnormal noise due to resonance, can be suppressed. Additionally, an increase in chain tension due to resonance can be avoided, and consequently the useful life of the device can be extended increase endurance and reliability can be realized. Furthermore, the enhanced quietness and suppression of resonance afforded by the invention make it possible to reduce the amount of sound insulation around the chain transmission and to decrease the rigidity of peripheral parts (for example, reducing wall thicknesses or the like) become possible, leading to significant cost reduction.

DETAILED DESCRIPTION OF THE PREFERRED EMBODIMENTS

Figure 1:
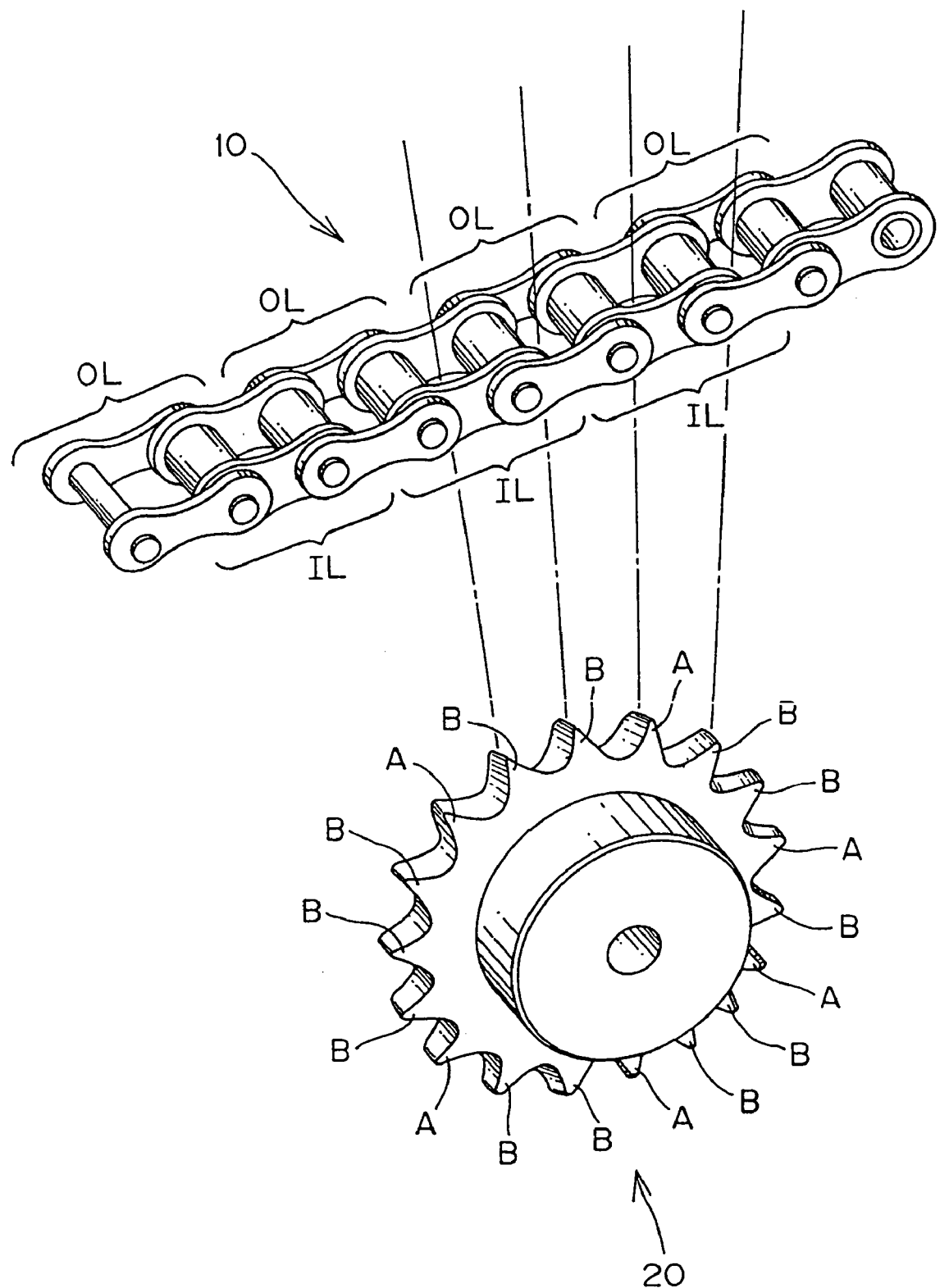
FIG. 1 is an exploded perspective view of a sprocket and a portion of a roller chain in a roller chain transmission device according to the invention.
Figure 2:
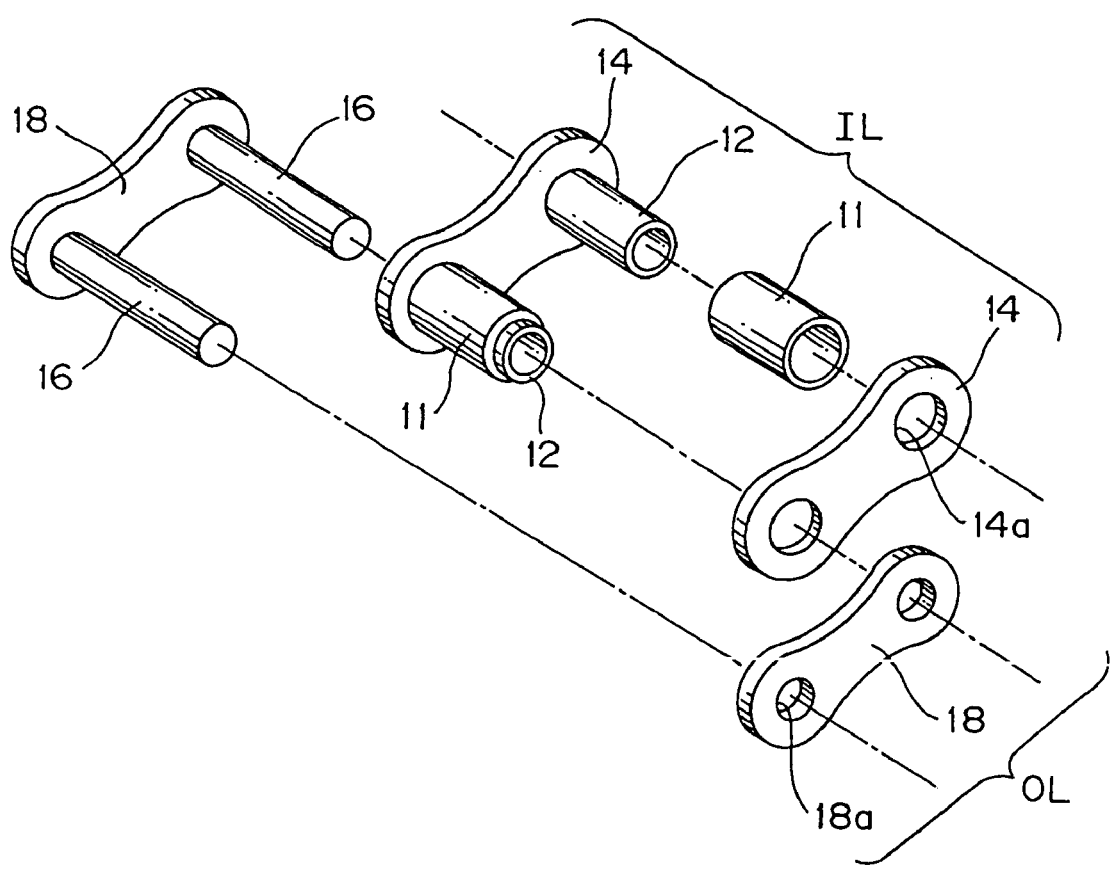
FIG. 2 is an exploded perspective view showing a part of the roller chain.

The roller chain transmission device according to the invention comprises a roller chain, the details of which are shown in FIG. 2. The chain includes an inner link IL, comprising a pair of inner plates 14 with bushing holes 14a, into which the ends of two cylindrical bushings 12 are respectively press-fit. A roller 11 fits rotatably on each bushing 12. Pins 16 are press fit in pin holes 18a of a pair of outer link plates 18, which are disposed adjacent the outsides of the inner link plates. As seen in FIG. 2, one of the pins 16 extends through one of the bushings of the inner link IL, fitting loosely therein so that the outer link OL is in articulating relationship with the inner link IL. Similar inner and outer links are articulably connected to one another in alternating relationship to form a flexible roller chain 10, as shown in FIG. 1. The flexible roller chain can engage a driving sprocket 20, and at least one driven sprocket (not shown) to form a chain transmission in which power is transmitted from the driving sprocket to the one or more driven sprockets.

As shown in FIG. 1, the sprocket 20 has teeth A and B arranged in random order. Teeth A and B having different tooth forms, and the number of teeth B does not exceed four times of the number of the teeth A.

Moreover, as seen in FIG. 1, none of the teeth A is immediately preceded or followed by another tooth A. Rather, each of teeth A is immediately preceded and followed by a tooth B.

Figure 3:
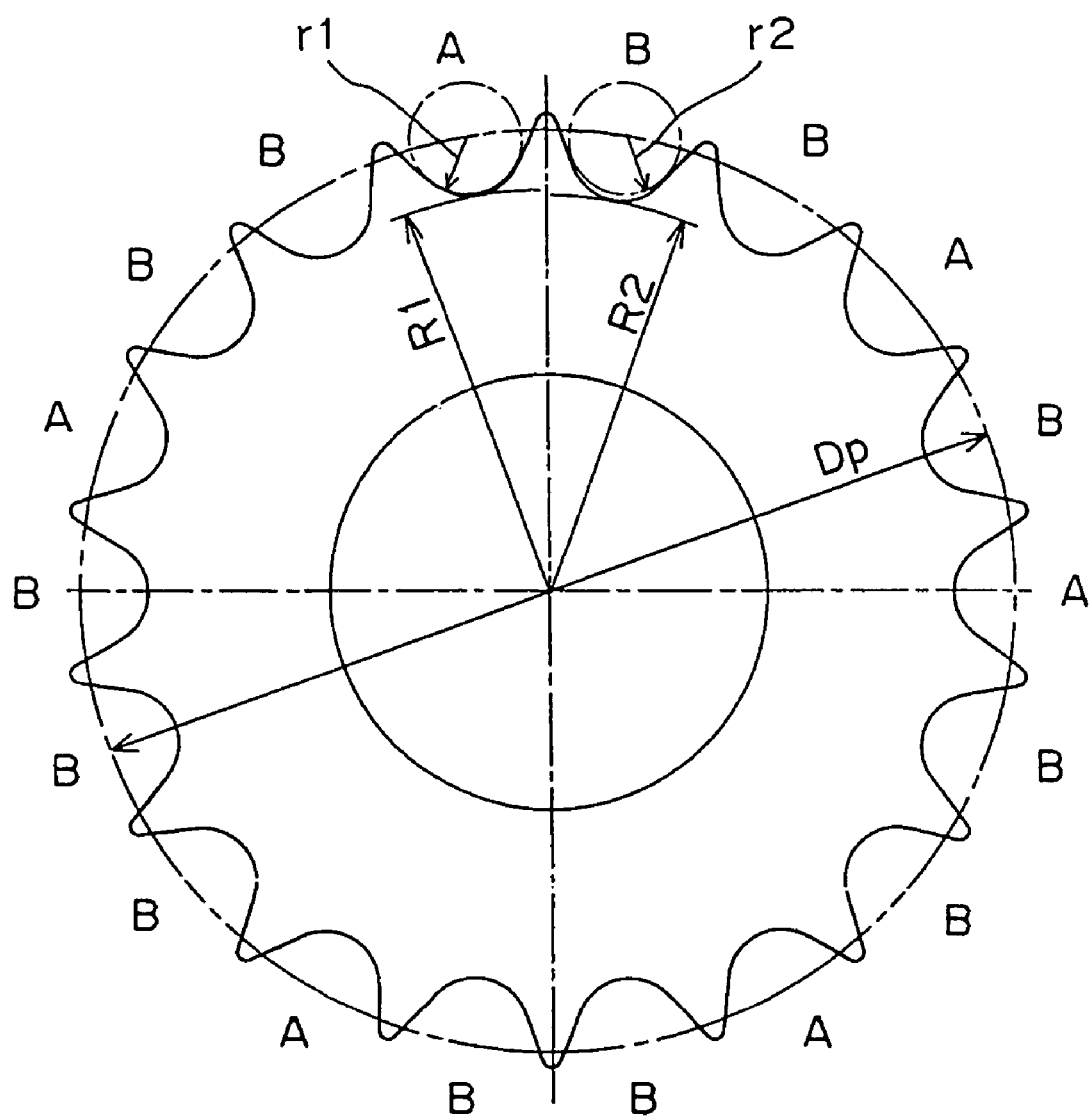
FIG. 3 is an elevational view of the sprocket.

As shown in FIG. 3, if a root radius of a tooth A is defined as R1, the radius of the arc of the bottom portion of the tooth A is defined as r1, the root radius of a tooth B is defined as R2, and the radius of the arc of the bottom portion of the tooth B is defined as r2, teeth A and teeth B have tooth forms designed to satisfy the following relational expressions with respect to the pitch diameter Dp of the sprocket, the outer diameter Dr of a roller in the roller chain and the chain pitch P:

$R1=(Dp-Dr)/2$ $R1-0.05\ P<R2<R1-0.015\ P$ $0.505\ Dr<r1<0.505\ Dr+0.069\ \sqrt[3]{Dr}$ $0.50\ Dr<r2<r1$ In the first example, the driving sprocket, as shown in FIG. 3, has six teeth A and twelve teeth B. The pitch diameter Dp is 46.07 mm, the root radius R1 of the teeth A is 20.21 mm, the radius r1 of the arc of the bottom portion of teeth A is 2.91 mm, the root radius R2 of the teeth B is 19.91 mm, the radius r2 of the arc of a bottom portion of teeth B is 2.87 mm. The roller chain, with which the sprocket is in mesh, has a chain pitch P of 8.00 mm, and the outer diameter Dr of its rollers is 5.65 mm. The driven sprocket has 36 teeth.

Figure 5:
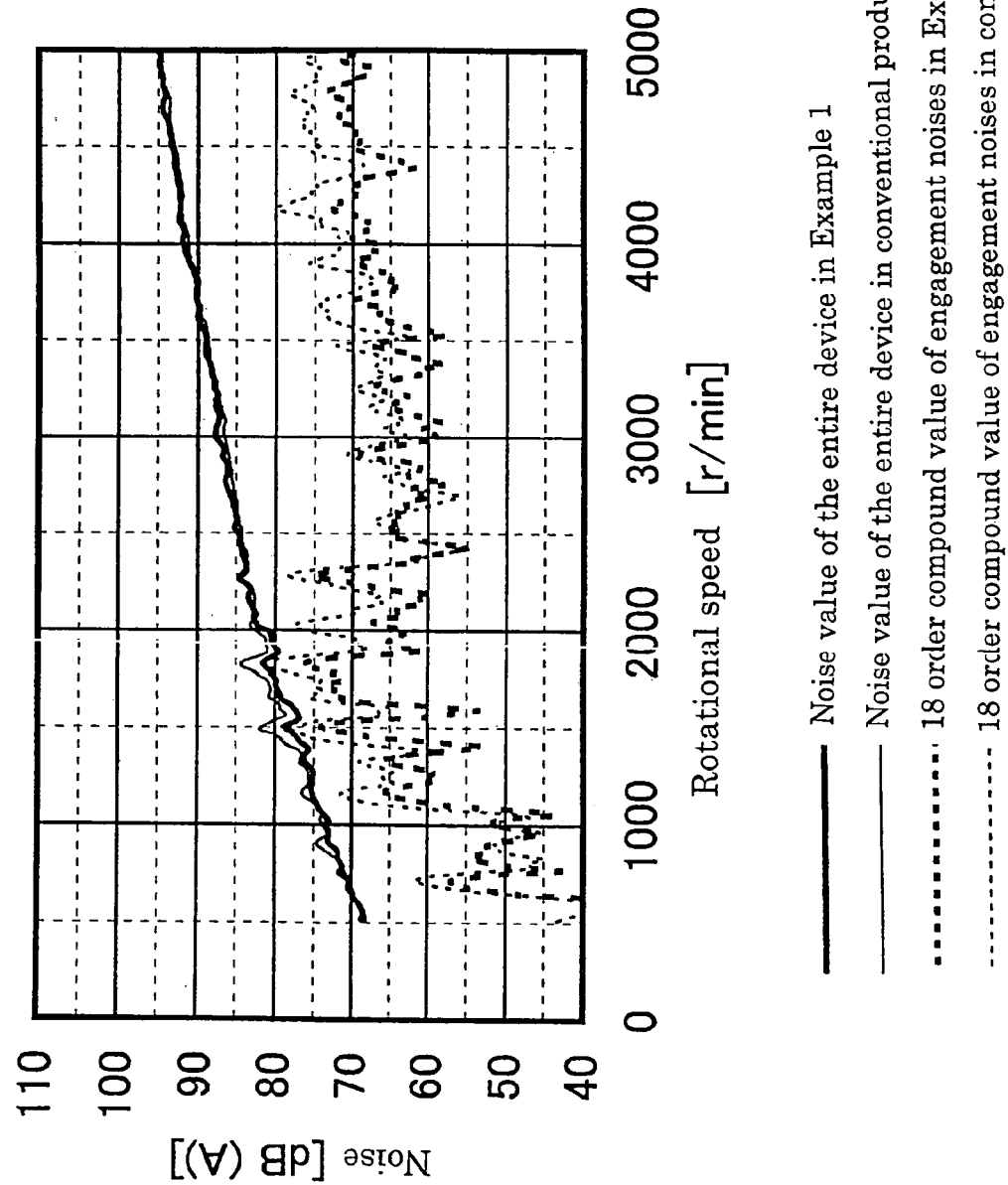
FIG. 5 is a graph showing results of noise measurements on a roller chain transmission device in accordance with a first example of the invention.

The results of noise measuring tests on the above-described roller chain transmission are shown in FIG. 5. The noise measurements were taken by changing the rotational speed of a drive sprocket from 500 r.p.m. to 5000 r.p.m. while measuring both the rotational speed of the drive shaft, and the 18th order compound value of the sound magnitude corresponding to an overall value at a position 100 mm in front of the drive shaft. The term "order" refers to a multiple of the rotational speed. That is, an 18 order compound value is the magnitude of the sound generated by the transmission, measured at the measurement position, at a frequency that is 18 times the rotational speed of the drive sprocket. This is the predominant noise generated by a roller chain transmission device. In the conventional product used for comparison, the same transmission was used, except that the drive sprocket was a conventional sprocket having 18 teeth.

As can be seen from FIG. 5, overall noise values for the entire transmission device were reduced at 900, 1200, 1500, and 1800 revolutions per minute. Furthermore, the 18th order compound value of engagement noise was reduced by a few dB to 10 dB over substantially the entire region of measured rotational speed. Although only the results of the noise measuring tests on the roller chain transmission device of the first example are shown, it was confirmed experimentally that the suppression effect on overall noise values and the reduction of engagement noises in the rotational speed region shown in FIG. 5 were reproducible when sprockets which satisfy the above-described conditions, were used.

Figure 4:
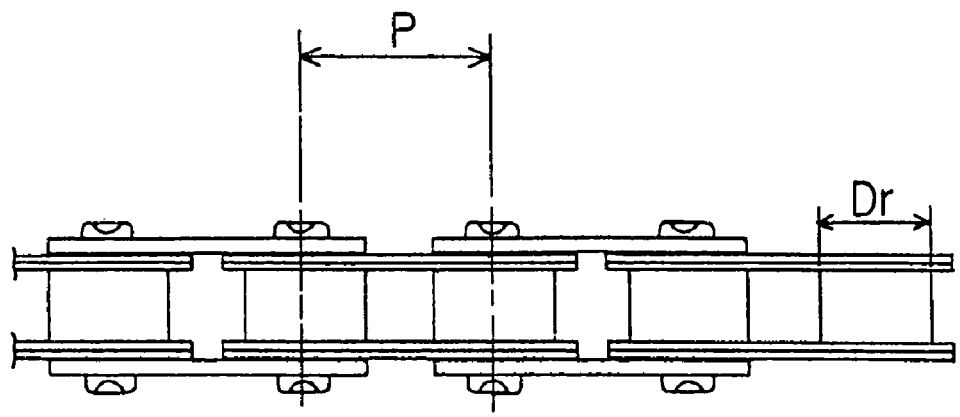
FIGS. 4(a) and 4(b) are respectively a plan view and an elevational view of the roller chain.
Figure 4:
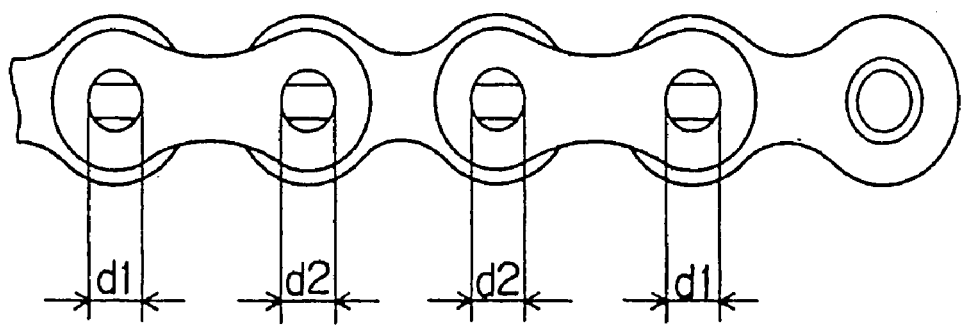

In a second example, instead of the roller chain used in the roller chain transmission device of the first example, a roller chain was used in which the pins, which articulably connect the inner and outer links of the chain, have two different pin diameters and are arranged randomly along the chain. It was confirmed that a remarkable reduction of engagement noises was achieved. Furthermore, it was confirmed experimentally that this effect is reproducible by setting the number of the smaller diameter pins at 20% or more of the total number of pins in the roller chain and also setting the number of larger diameter pins at 20% or more of the total number of pins in the chain, and, in each case satisfying the relational expression $0.992\ d1 \leq d2 \leq 0.998\ d1$, when the diameter of the smaller pin is defined as d1, and the diameter of the second pin is defined as d2, as shown in FIG. 4.

Figure 6:
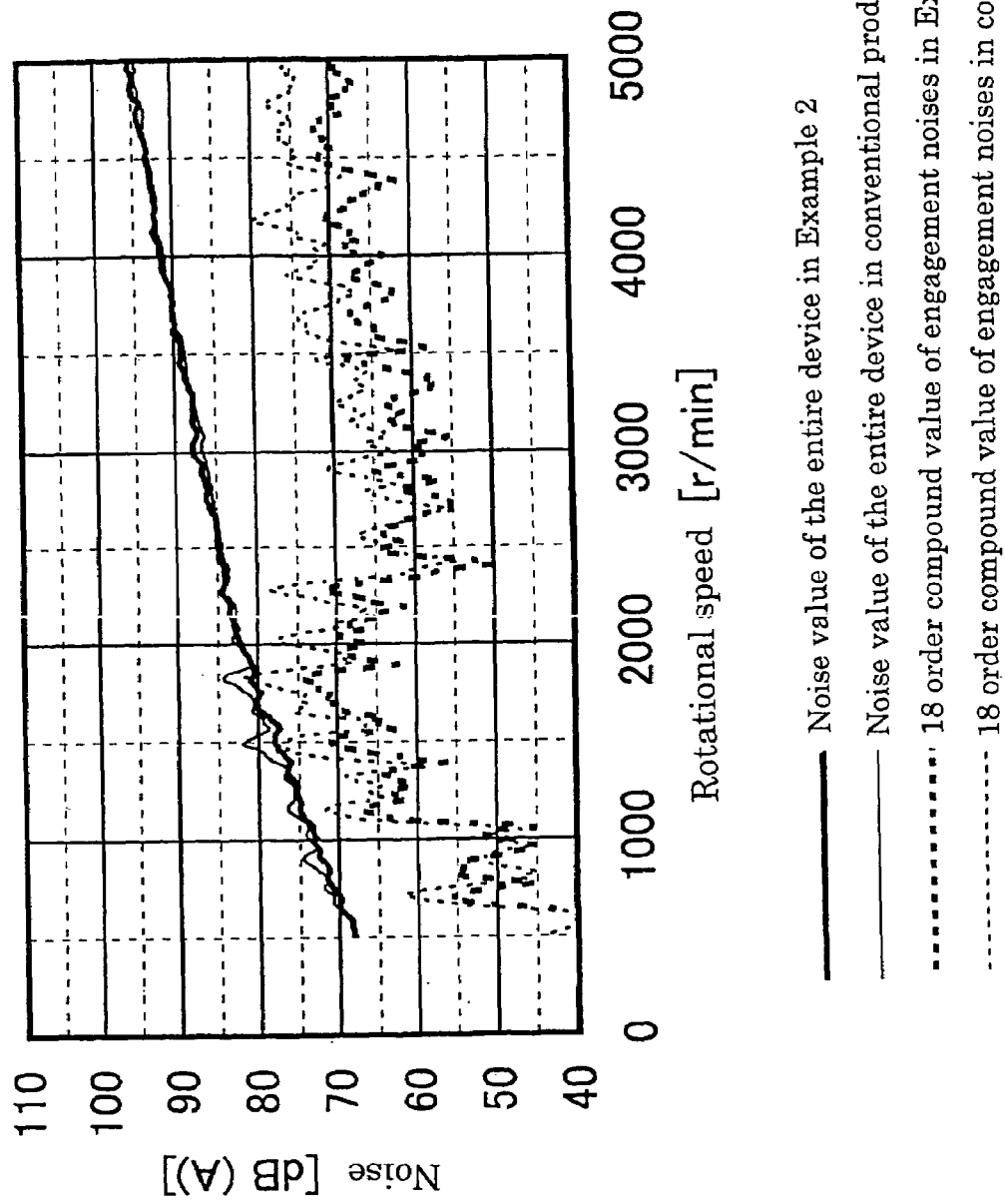
FIG. 6 is a graph showing results of noise measurements on a roller chain transmission device in accordance with a second example of the invention

FIG. 6 shows the results of noise measurements on a roller chain transmission of the second example, using a roller chain having two kinds of pins having different diameters. In this case the diameter d1 of the first pins was 3.045 mm, and the diameter d2 of the second pins was 3.030 mm. The ratio of the number of first pins to the number of second pins was 70:30. Otherwise, the test conditions were the same as those of the noise measurements described for the first example.

As can be seen from FIG. 6, with the roller chain transmission device of the second example, overall noise values for the entire device, generated near 900, 1200, 1500, and 1800 revolutions per minute, were reduced substantially. Furthermore, a large reduction in the 18th order compound noise was observed over substantially the entire range of measured rotational speed.

INDUSTRIAL APPLICABILITY

The invention reproducibly results in a reduction in engagement noises in a roller chain transmission, and suppresses overall noise values for the entire transmission device at specific rotational speeds. Thus the invention not only contributes to reduction in noise in the timing drive of an automobile engine. The invention also enhances endurance of the drive, and simplifies drive system design. The invention also affords advantages power transmissions and feeding mechanism of industrial machinery.

I claim:

1. A roller chain transmission comprising:
   a roller chain including inner links, each comprising a pair of inner link plates, two bushings, ends of which fit into bushing holes formed in said inner link plates with a press fit, and a roller rotatable on the outside of each said bushing, and outer links, each comprising a pair of outer link plates and two pins fitting into said outer link plates with a press fit, in which the outer link plates of each outer link are in overlapping relationship with the inner link plates of two adjacent inner links, and a pin of each outer link extends loosely through a bushing of an adjacent inner link, whereby the inner and outer links are connected articulably in alternating relationship along the length of the chain;
   and a sprocket having a tooth form, which engages with said roller chain;
   in which said sprocket has at least first teeth and second teeth having different tooth forms, said first teeth having a root radius R1 and said second teeth have a root radius R2, said first teeth and second teeth being randomly distributed on the periphery of the sprocket, and the number of said second teeth does not exceed four times the number of said first teeth, and the teeth immediately preceding and following each of said first teeth on the periphery of the sprocket are teeth of said second teeth; and,
   in which the root radius R1 of said first teeth, the radius r1 of the arc of a bottom portion of the first teeth, the root radius R2 of said second teeth, the radius r2 of the arc of the bottom portion of the second teeth, the chain pitch P, the pitch diameter Dp of said sprocket, and the outer diameter Dr of said rollers, satisfy the relational expressions $R1=(Dp-Dr)/2$ $R1-0.05P<R2<R1-0.015\ P$ $0.505\ Dr<r1<0.505\ Dr+0.069\ \sqrt[3]{Dr}$ $0.50\ Dr<r2<r1$.

2. The roller chain transmission according to claim 1, in which, in said roller chain, said pins comprise first pins second pins having different pin diameters, randomly arranged in a longitudinal direction of said roller chain.

3. The roller chain transmission according to claim 2, in which said first pins are present in said chain at a ratio of at least 20% of the total number of the pins in said chain, said second pins are also present in said chain at a ratio of at least 20% of the total number of the pins in said chain, and the diameter d1 of said first pins and the diameter d2 of said second pins satisfy the relational expression $0.992\ d1 \leq d2 \leq 0.998\ d1$.

4. A roller chain transmission comprising:

a roller chain including inner links, each comprising a pair of inner link plates, two bushings, ends of which fit into bushing holes formed in said inner link plates with a press fit, and a roller rotatable on the outside of each said bushing, and outer links, each comprising a pair of outer link plates and two pins fitting into said outer link plates with a press fit, in which the outer link plates of each outer link are in overlapping relationship with the inner link plates of two adjacent inner links, and a pin of each outer link extends loosely through a bushing of an adjacent inner link, whereby the inner and outer links are connected articulably in alternating relationship along the length of the chain;

and a sprocket having a tooth form, which engages with said roller chain;

in which said sprocket has at least first teeth and second teeth having different tooth forms, said first teeth and second teeth being randomly distributed on the periphery of the sprocket, and the number of said second teeth does not exceed four times the number of said first teeth, and the teeth immediately preceding and following each of said first teeth on the periphery of the sprocket are teeth of said second teeth;

in which, in said roller chain, said pins comprise first pins and second pins, having different pin diameters, randomly arranged in a longitudinal direction of said roller chain; and in which said first pins are present in said chain at a ratio of at least 20% of the total number of the pins in said chain, said second pins are also present in said chain at a ratio of at least 20% of the total number of the pins in said chain, and the diameter $d_1$ of said first pins and the diameter $d_2$ of said second pins satisfy the relational expression $0.992\ d_1 \leq d_2 \leq 0.998\ d_1$.

* * * * *